United States Patent [19]

Henriquez

[11] Patent Number: 4,840,737

[45] Date of Patent: Jun. 20, 1989

[54] PROCESS FOR SEPARATING SOLID PARTICLES AND/OR LIQUID FROM A SUSPENSION AND WASH COLUMN

[75] Inventor: Percy C. Henriquez, Holten, Netherlands

[73] Assignee: Douwe Egberts Koninklijke Tabaks-fabriek-Koffiebranderijen-Theehandel N.V., Utrecht, Netherlands

[21] Appl. No.: 17,873

[22] Filed: Feb. 24, 1987

[30] Foreign Application Priority Data

Feb. 24, 1986 [NL] Netherlands ................ 8600461

[51] Int. Cl.⁴ ................ B01D 23/24; B01D 11/02
[52] U.S. Cl. ................ 210/772; 210/794; 210/796
[58] Field of Search ............ 210/772, 797, 791–796, 210/798, 269–278, 190, 191

[56] References Cited

U.S. PATENT DOCUMENTS

| | | | |
|---|---|---|---|
| 3,385,753 | 5/1968 | Rich | 162/251 |
| 3,587,859 | 6/1971 | Probstein et al. | 210/772 |
| 3,738,814 | 6/1973 | Cloete et al. | 23/270 |
| 3,797,662 | 3/1974 | Titus | 210/772 |
| 4,323,539 | 4/1982 | Chilson | 422/278 |
| 4,338,201 | 7/1982 | Ducasse | 210/772 |

FOREIGN PATENT DOCUMENTS

| | | |
|---|---|---|
| 1223343 | 8/1966 | Fed. Rep. of Germany. |
| 2921871 | 12/1980 | Fed. Rep. of Germany. |
| 2367515 | 5/1978 | France. |
| 1194460 | 6/1984 | U.S.S.R. ............ 210/797 |
| 1555357 | 11/1979 | United Kingdom. |

Primary Examiner—Tom Wyse
Attorney, Agent, or Firm—Cushman, Darby & Cushman

[57] ABSTRACT

The invention is directed to a process for separating solid particles and/or liquid from a liquid suspension and/or purifying or leaching solid particles in a column containing a compacted bed, which comprises supplying a liquid suspension to said column while withdrawing liquid phase therefrom through a filter construction, disintegrating the washed compacted bed and removing the product of this disintegration, the washfront in the compacted bed being moved between two extreme limits in the compacted bed and to a wash column for use in this process.

The process of the invention is characterized by introducing said liquid suspension in the column and adjusting the pressure below a maximum permissible pressure in the column, extracting an amount of liquid therefrom through said filter construction leaving a pseudo-liquid residue of solid particles, said residue accumulating and by so accumulating adopting a translatory movement in the axial direction of the column, and thereby passing through disintegration means in the column.

6 Claims, 4 Drawing Sheets

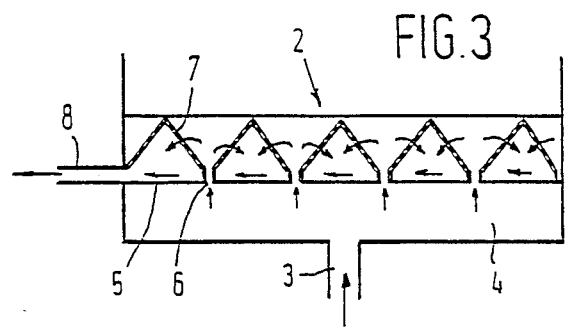
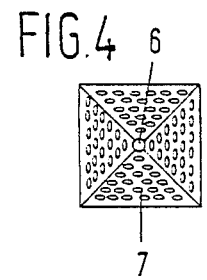
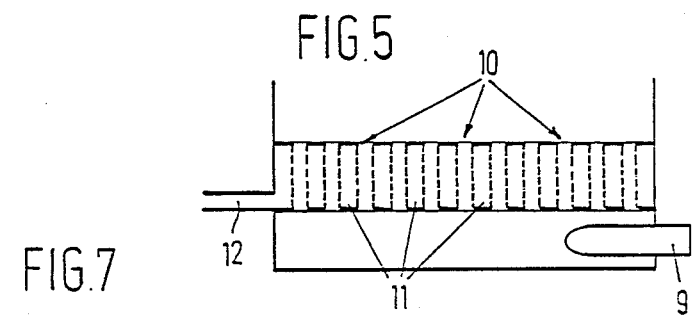
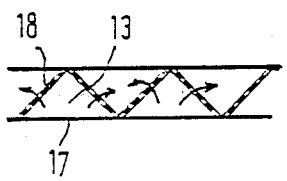
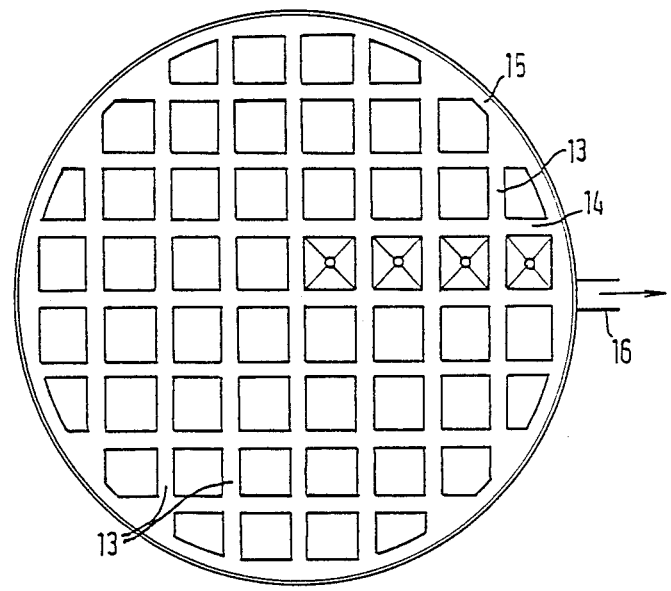

PROCESS FOR SEPARATING SOLID PARTICLES AND/OR LIQUID FROM A SUSPENSION AND WASH COLUMN

The invention is directed to a process for separating solid particles and/or liquid from a liquid suspension and/or purifying or leaching solid particles in a column containing a compacted bed, which comprises supplying a liquid suspension to said column whilst withdrawing liquid phase therefrom through a filter construction, disintegrating the washed compacted bed and removing the product of this disintegration, the washfront in the compacted bed being moved between two extreme limits in the compacted bed.

Furthermore the invention is directed to a wash column, suitable for carrying out the process of the invention, as well as static resisting and disintegrating means.

A method for separating crystals from a suspension and washing the crystals with a wash liquid in a continuous compacted-bed wash-column is inter alia described in British Pat. application No. 2,023,564. Mechanical means are used to move the bed of crystals continuously countercurrently to the wash liquid. This may for example be accomplished by using rotating tilted vanes. Disintegration of the bed of crystals is accomplished by melting or by using scrapers. The removal of the liquid is effected through filters, which can be situated at various places in the column.

Another method for continuously separating crystals from a suspension and washing the crystals with a wash liquid is disclosed in European Pat. application No. 97405. According to that publication a static wash column is provided which uses pulsating flow in the column with the filters for removing the liquid being evenly distributed over the entire cross-section of the column. A number of long tubes is present in the column, and a portion of the wall of each tube is provided with at least one filter. The result is claimed to be a uniform removal of the liquid over the whole cross-section of the column, together with an appreciable friction between the packed crystal bed, the wall of the column and the surface of the tubes.

Although this patent provides an improvement in case crystals forming a relatively soft compacted bed have to be removed from suspensions, the necessity to provide a pulsating flow leads to a potential disturbance of the wash front in the compacted bed, while furthermore it requires difficult and expensive equipment.

In European Pat. application No. 191194, which was published after the priority date of the present application, a method and apparatus of the same kind are described, in which a specific filter construction is used to remove the liquid, and a mechanical scraper is provided to disintegrate the compacted bed. The movement of the bed is obtained by applying a pulsating flow.

It is an object of the present invention to provide a process and wash column for separating solid particles and/or liquid from a suspension, using a wash column which has no moving parts to promote the translatory movement of the compacted bed, and whereby no pulsation is necessary.

The process of the invention is characterized by introducing said liquid suspension in the column, adjusting the pressure below a maximum permissible pressure in the column, extracting an amount of liquid therefrom through said filter construction leaving a pseudo-liquid residue of solid particles, said residue accumulating and by so accumulating adopting a translatory movement in the axial direction of the column, and thereby passing through disintegration means in the column.

In the process of the present invention, the suspension is passed through a filter construction in the wash column including a filter of such capacity that using normal process conditions at a predetermined column pressure a desired amount of filtrate and/or a desired concentration degree of the residue occurs while forming a pseudo-liquid residue, the filter construction being of such a shape that by transport of the suspension through this filter construction alongside the filter a substantially stationary condition is reached as far as the thickness of the pseudo liquid residue (filter cake) is concerned, before the amount of filtrate obtained and/or concentration degree of the residue is decreasing unacceptably, whereby after reaching the stationary condition a substantially continuous removal of the residue which forms is obtained.

The term "pseudo-liquid" as used herein refers to a consistency wherein the solid particles in the mass which is obtained by removal of the liquid through a filter, pass on pressure to each other in such way that a homogenization of the mass occurs.

In a very important embodiment of the invention the solid particles are crystals forming upon the separation of at least one component in crystallized form from a liquid multi component system for example by cooling, or from a super-saturated solution. Suitable systems are, for example, coffee or tea extracts, fruit juices, but also reaction mixtures containing solvents and/or impurities.

The pseudo-liquid consistency as required by the present invention is only possible within a certain range of ratios between solid particles and liquid. If the amount of liquid is too large, the solid particles cannot pass on pressure to each other, and if the amount of liquid is too small, the particles are not or almost not able to move along each other for the mass to achieve homogenization. Suitable liquid/solid ratios, by volume, are from 1:10, to 10:1, preferably 3:2 to 2:3. The ratios are substantially dependent upon the kind of liquid and solid, and can easily be determined by the man skilled in the art using routine experiments. The solid/liquid ratio can be influenced by the choice of filter, the pressure, temperature, viscosity, etc.

According to a preferred embodiment of the process of the invention the wash column used is provided at one end of the column with a filter construction which takes up the whole cross-section of the column. Preferably the suspension is forced in a restricted pathway along the filter, said pathway having an end opening into a space between the filter construction and disintegration means.

The cross-section of the column can have various forms, such as cylindrical, annular, rectangular or square. Preferably the cross-section is cylindrical or annular.

Depending on the kind of suspension to be treated it is possible to have static disintegration means, i.e. having no moving parts, or moving disintegration means, such as a scraper.

After the compacted bed has passed through the disintegration means, and has been disintegrated into separate particles, the particles can be removed from the wash column by introducing wash fluid at the side of the disintegration means opposite to the side where the compacted bed is present, and flushing out the disintegrated product with wash fluid.

The process conditions of the present invention, as far as not described herein in detail, correspond to the conditions substantially as described in British Pat. application No. 2,023,564, the subject matter of which is incorporated herein by reference.

The present invention is also directed to a wash column for separating solid particles and/or liquid from a suspension, which wash column is suitable for carrying out the process of the present invention. The wash column of the invention comprises enclosure means enclosing a space of cylindrical, annular, rectangular or square cross-section feed-in means for said suspension at one end of said space;

a filter construction across said space, which said suspension has to traverse after being fed into said space, for extracting liquid from said suspension, leaving a pseudo liquid residue plus a mobile accumulating residue of thickened slurry of said solid particles, said mobile residue by the pushing effect of that accumulation adopting a translatory movement in axial direction of said space;

resisting means across the space at a distance of said filter construction, for creating a resistance to said translatory movement of said accumulating thickened slurry of solid particles, so as to transform it into a compacted bed and disintegrating said compacted bed at its passage through said resisting means;

feed-in means for wash fluid at the other side of said resisting means;

feed-out means, equally at the other side of said resisting means, for said wash fluid to flush out the disintegration product of said compacted bed;

feed-out means to feed the liquid extracted from said suspension out of said filter construction and of said cylindrical space said filter construction comprising:

at least one filter;

means for forcing said suspension in a restricted pathway along each of said filters, said pathway having an end opening into said cylindrical space, facilitating the discharge of said mobile accumulating residue of thickened slurry left behind after extracting liquid from said suspension through said filters, said pathway furthermore being of such a shape and dimensions that a dynamic equilibrium is reached with regard to the thickness of said pseudo liquid residue deposited on said filters, at a pressure below a maximally allowed pressure in the column;

means for regulating the pressure at the feed-in of the suspension and at the feed-out of the wash liquid.

The resisting means as mentioned hereinabove are identical to the disintegration means as described in relation to the process. The present invention will now be elucidated with reference to the accompanying drawings, wherein FIG. 1 gives a schematic diagram of a wash column with one filter conus and simplified disintegration means in the case of a soft compacted bed.

FIG. 2 shows the lower part of a wash column according to FIG. 1, wherein the suspension is supplied according to the principle elucidated in FIG. 14.

FIG. 3 gives a schematic view of a filter construction according to the principle elucidated in FIG. 19, FIG. 4 shows an element of the filter construction shown in FIG. 3 from above, FIG. 5 shows a longitudinal section of a filter construction according to the principle of FIG. 15, FIG. 6 shows a filter construction according to the principle of FIG. 19 from above, FIG. 7 shows a longitudinal section of some of the bars, FIG. 8 is a view from above of an embodiment of the filter construction according to the principle of FIG. 3, FIG. 9 is a longitudinal section of the embodiment of FIG. 8 along the line IX—IX.

In the FIGS. 10-19 a number of embodiments of various constructions or the lower part of a compacted bed wash column with filter construction are given. FIGS. 13-19 are embodiments of the invention, and the FIGS. 10-12 serve as a comparison with embodiments which do not suffice the criteria of the invention and do not lead to a good result.

FIG. 10 shows a filter which is perpendicular to the longitudinal axis of the wash column (horizontal). The liquid suspension supplied from aside above the filter passes substantially vertically through the filter. A filter cake is formed which grows thicker and thicker, if it is not removed mechanically with rotating vanes. If one wants to keep the amount of filtrate passing through the filter constant the filter pressure will have to be increased constantly. When the maximum allowable pressure of the wash column has been reached, the amount of filtrate will continue to decrease due to the growth of the thickness of the filter cake. For a static wash column, containing substantially no moving parts, this construction cannot be used.

In FIG. 11 the suspension is supplied centrally through the filter from below, but in this situation the same problems occur as described with reference to FIG. 10.

FIG. 12 shows wall filters, and also in this case the filter cake becomes gradually thicker. In this situation the same problems occur as with the filter described in FIG. 10.

FIG. 13, an embodiment of the invention, shows a filter having a conical form. It is clear from the flow lines that the pseudo liquid residue can only reach a certain thickness. The upward flow of the suspension supplied imposes a limit on the thickness of the filter cake. The remainder is passed on upwards. In the pseudo liquid mass a pressure is built up, through which this mass is removed in the upward direction. To prevent blockage the perforations in the lower part, for example ¼th-1/5th of the conus can be closed.

FIG. 14 shows a wider conus as filter, and before the suspension is supplied to the conus it is fed to a cylindrical box. The supply of the suspension therein is tangential, so that a cyclone flow occurs. The suspension entering the conus will therefore tend to approach the conical form.

FIG. 15 shows a number of tube-like filters distributed across the cross-section of the column. The thickness of the residue on the filter can never become larger than the radius of the filter tube. The supply opening for each filter tube has to be so small that a sufficient pressure drop occurs to obtain about equal supply of suspension to each of the filter elements.

FIG. 16 shows a filter cone provided with an imperforate inner cone. It is clear that the thickness of the filter cake is restricted, and the solids accumulating after a certain thickness has been reached will be pushed away by the suspension flow along the inner cone. To prevent blockage of the supply opening it is possible to leave out the perforations of the lower part of the filter cone.

Figure 19:
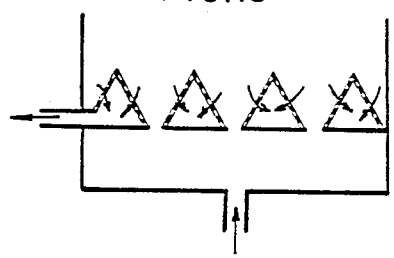

FIG. 19 has filter elements with a triangular section of which two sides, the upper ones are filters. The cross-section of the washing column is provided with these elements. In case of bars they can be fitted together to form a hollow grid; either with parallel bars, or with crossing bars. It is also possible to use concentric rings the interiors of which are connected with each other. The division of the total filter circuits into very many small areas makes it possible to build up a thick pseudo liquid residue within the filter triangles. It is possible here to have a construction of such a kind that a large pressure drop occurs at the supply openings of the suspension in order to achieve maximum performance of the filter areas. This also assures that the suspension is divided substantially equal across the filter. It is of course also possible to use bars having other cross-sectional areas, such as a square cross-section with one or two sides functioning as filter elements, the filter elements being on the upper side of the filter construction.

Figure 1:
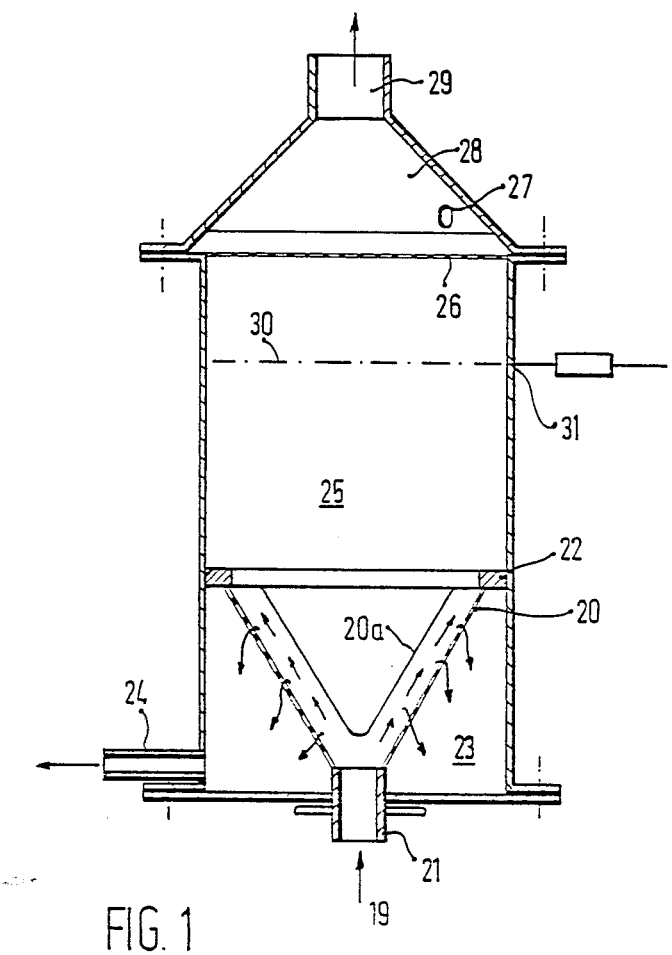

In FIG. 1, the inlet of the suspension is shown at 19, and the filtering part of the hollow perforated body is shown at 20. This filtering part is of frusto-conical construction, secured at one end to supply pipe 21 and at the other to ring 22. The liquid from the suspension finds its way through filter 20 into cavity 23 and is discharged at 24. Shown at 20a is the inner cone, as described before. The packed crystal bed moves upwardly into space 25. In the case of a compacted bed that is relatively soft, of, e.g., organic chemicals such as p-xylene, the disintegrator may simply be a grid in the form of a perforated plate or wire gauze, designated by 26. The washing liquid can be supplied tangentially, at 27, to space 28 to be discharged at 29. A washing front is indicated at 30, and a sensor at 31.

In the case of crystal beds that are less soft but unsintered, a hollow grid can be used with perforations through which liquid (washing liquid) is injected for disintegration.

Close to the disintegration grid, inhomogeneities are of course formed in the packed bed. Yet a homogeneous washing activity can be realized, as in many cases the compacted bed exhibits pseudo-liquid (i.e., autohomogenizing) properties, so that this bed approaches the disintegration grid in substantially homogeneously packed condition. At a certain distance from the disintegration grid, therefore, there is homogeneity with respect to both the solid particles in the bed and the washing stream, taken across the cross-section of the washing column perpendicular to the axial direction. This distance is smaller as the meshes of the grid are smaller, so that the disturbances in homogeneity are of finer structure. In the case of the occurrence of a washing front, therefore, this can be brought closer to the disintegrator as the disturbances in homogeneity are individually smaller.

It follows from the above that all sorts of forms of disintegration grids are possible, if only the height of the washing column is adapted to them. Concentric rings, parallel or coiled grid elements, for example, are not excluded.

It will be clear that a filter according to the present invention can be combined with a disintegrator according to the invention, but, if necessary, also with a conventional disintegrator fitted with knives. Conversely, a disintegrator according to the present invention can also be combined with a conventional bottom filter with mechanical propulsion means for the thickened slurry. The invention accordingly also relates to a static disintegrator.

Figure 2:
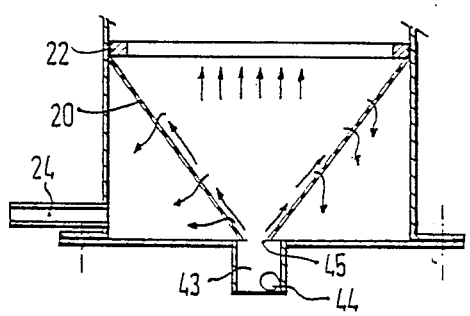

In FIG. 2, 43 represents a pipe in which the slurry, at 44, is tangentially introduced. When this slurry, at 45, enters the cone of the filter, it has a rotating movement and tends to spread conically. In so doing, it moves along the filter surface with a "sweeping" effect on the filter cake being formed. As a consequence, the slurry passed along the filter surface is always fresh.

In FIG. 3, the bottom part of the washing column is designated by 1, the hollow perforated body by 2. At 3, the slurry is supplied to space 4, which is closed by the bottom plate 5 of the perforated hollow body 2. From this space, the slurry enters the hollow body 2 through apertures 6 of bottom plate 5. The perforated parts of the hollow body which act as a filter are designated by 7. The liquid passed by the filter is removed at 8.

FIG. 4 illustrates a plan view showing one of the meshes of the hollow perforated body. The aperture for the supply of the slurry is shown at 6, and the filtering sides at 7.

FIG. 5 shows a tangential supply of slurry at 9, the hollow body at 10, the tubular filter elements at 11, and the discharge of the filtrate at 12.

FIG. 6 illustrates hollow grid bars at 13 and 14, an annular header 15 interconnecting the interiors of all bars, and a filtrate outlet at 16. A "plan view" of the meshes between the grid bars is shown for four meshes only (centre-right-hand side).

FIG. 7 shows a few hollow grid bars 13 in cross-section, showing filtering portions 18 and non-filtering portions 17.

Figure 8:
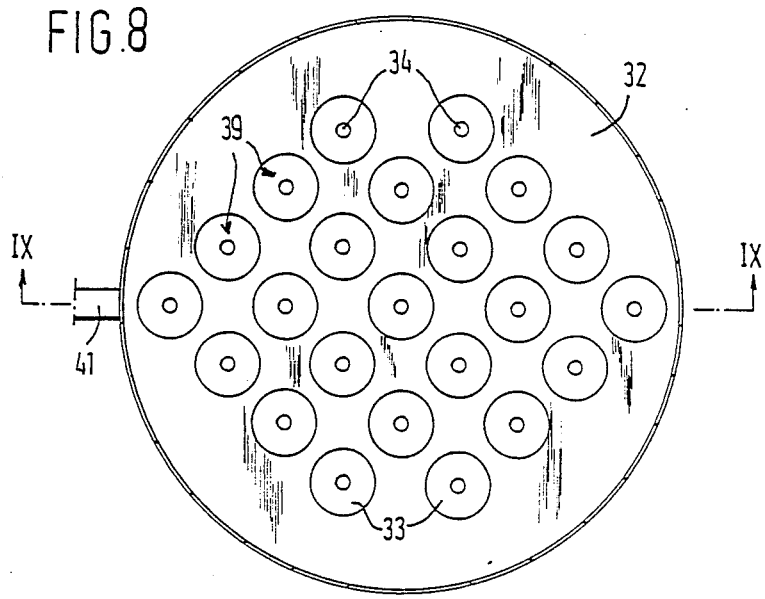
Figure 9:
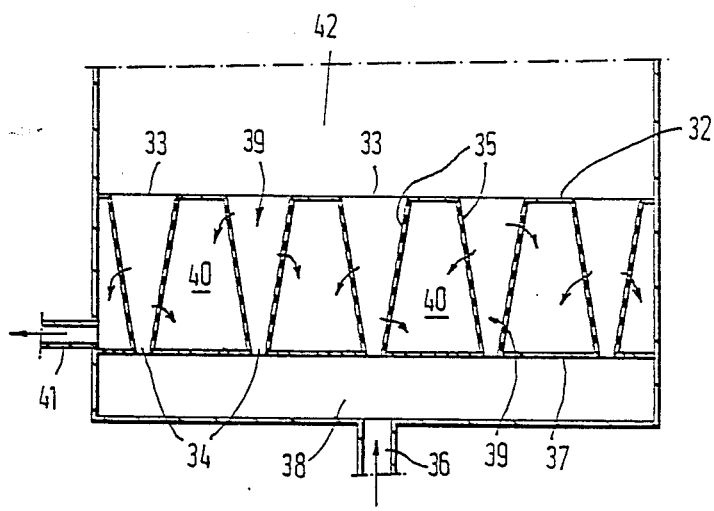
Figure 10:
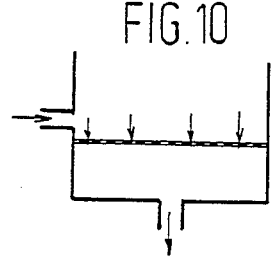
Figure 11:
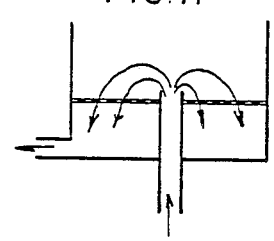
Figure 12:
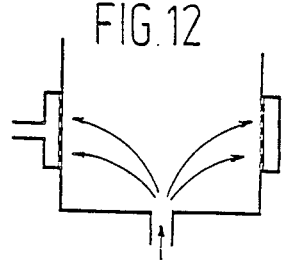
Figure 13:
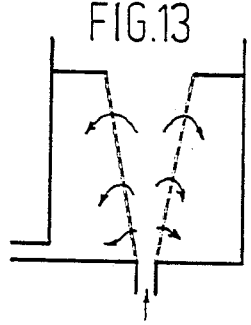
Figure 14:
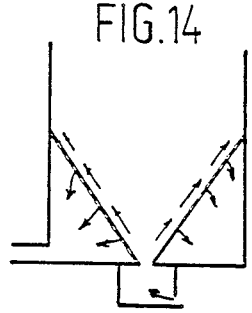
Figure 15:
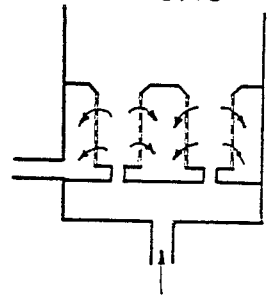
Figure 16:
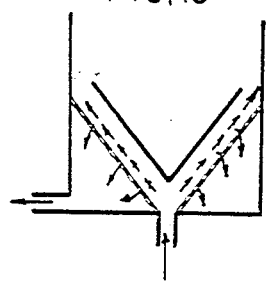
Figure 17:
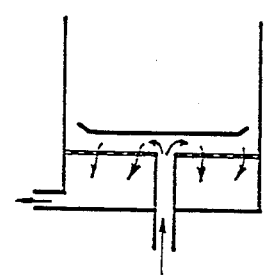
FIG. 17 shows a horizontal filter with a guide plate which is placed at some distance above it. The function is comparable with what has been described with reference to FIG. 16.
Figure 18:
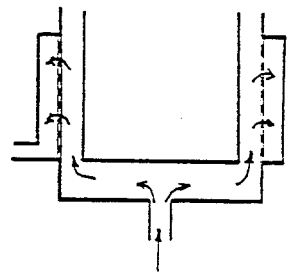
FIG. 18 shows the use of wall filters having guide plates similar to FIGS. 16 and 17.

FIG. 8 shows a top plate 32 of the hollow perforated body, which has the general form of a round box. The crystal outlet apertures in top plate 32 are designated by 33, and the inlet apertures at 34. The figure shows the filter 35, looking into the frustoconical part of the hollow body. The slurry enters at 36, and passes through apertures 34 of bottom plate 37 through space 38. Entering the conical spaces 39, the liquid is "sucked" out of the slurry, or pushed away by filter 35, and enters space 40 to be discharged at 41. In space 39, kinetic energy of the slurry is converted into energy of compaction and movement of the crystal mass remaining after the removal of the liquid. The crystal mass exiting the conical spaces 39 in space 42 is there homogenized as it moves along in the axial direction of the washing column.

It is clear that the pressure drop in apertures 34 should be so high that the filters are uniformly supplied.

I claim:

1. Process for separating solid particles from a liquid suspension and purifying or leaching solid particles in a column containing a compacted bed, which comprises the following steps:

supplying a liquid suspension to said column, while withdrawing liquid phase therefrom through a filter construction thus washing the compacted bed, the leading portion of said liquid phase forming a wash front, disintegrating the washed compacted bed and removing the product of this disintegration, the washfront in the compacted bed being moved between two extreme limits in the compacted bed, wherein introducing said liquid suspension in the column and adjusting the pressure below a maximum permissible pressure in the column, extracting an amount of liquid therefrom through said filter construction leaving a pseudo-liquid residue of solid particles, said residue accumulates and by so accumulating adopts a translatory movement in the axial direction of the column, and thereby passes through disintegration means in the column.

2. Process according to claim 1, wherein the filter construction is present at one of the column.

3. Process according to claim 1, wherein the suspension is forced in a restricted pathway along the filter, said pathway having an end opening into a cylindrical space between the filter construction and the disintegration means.

4. Process according to claim 1, wherein static disintegration means are used.

5. Process according to claim 1, wherein moving disintegration means are used.

6. Process according to claim 1, wherein wash fluid is introduced at the side of the disintegration means opposite to the side where compacted bed is present, and the disintegrated product is flushed out with wash fluid.

* * * * *